(12) United States Patent
Du

(10) Patent No.: US 11,734,362 B2
(45) Date of Patent: Aug. 22, 2023

(54) TAG RECOMMENDING METHOD AND APPARATUS, COMPUTER DEVICE, AND READABLE MEDIUM

(71) Applicant: Tencent Technology (Shenzhen) Company Limited, Shenzhen (CN)

(72) Inventor: Dongfang Du, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 239 days.

(21) Appl. No.: 17/242,172

(22) Filed: Apr. 27, 2021

(65) Prior Publication Data

US 2021/0248187 A1 Aug. 12, 2021

Related U.S. Application Data

(63) Continuation of application No. PCT/CN2019/126819, filed on Dec. 20, 2019.

(30) Foreign Application Priority Data

Dec. 20, 2018 (CN) .......................... 201811562385.5

(51) Int. Cl.
G06F 16/907 (2019.01)

(52) U.S. Cl.
CPC ................... *G06F 16/907* (2019.01)

(58) Field of Classification Search
CPC ............................. G06F 16/907; G06F 16/9535
See application file for complete search history.

(56) References Cited

U.S. PATENT DOCUMENTS

| 11,244,326 | B2 * | 2/2022 | Ning | G06Q 30/0201 |
| 2007/0100875 | A1 * | 5/2007 | Chi | G06Q 30/02 |
| | | | | 707/999.102 |

(Continued)

FOREIGN PATENT DOCUMENTS

| CN | 104951518 A | 9/2015 |
| CN | 106777123 A | 5/2017 |

(Continued)

OTHER PUBLICATIONS

"Learning Optimal Ranking with Tensor Factorization for Tag Recommendation", Steffen Rendle et al., Information Systems and Machine Learning Lab, Institute for Computer Science University of Hidesheim, Germany, KDD'09, Jul. 28-Jul. 1, 2009, ACM 978-1-60, pp. 727-736. (Year: 2009).*

(Continued)

*Primary Examiner* — Robert W Beausoliel, Jr.
*Assistant Examiner* — Susan F Rayyan
(74) *Attorney, Agent, or Firm* — Morgan, Lewis & Bockius LLP

(57) ABSTRACT

A tag recommending method is performed at a computer device, the method including: obtaining a target account and a target resource for which tag recommendation is to be performed; determining, by using a tag recommending model obtained after tensor decomposition, recommendation values of tags in tag data respectively corresponding to the target account and the target resource, the tag recommending model defining correspondences among account data including the target account, resource data including the target resource and the tag data; and determining n tags with highest recommendation values in the tag data as tags to be recommended to the target account, the n tags being used for marking the target resource, and n being a positive integer.

20 Claims, 6 Drawing Sheets

(56) References Cited

U.S. PATENT DOCUMENTS

| | | | | |
|---|---|---|---|---|
| 2008/0235216 | A1* | 9/2008 | Ruttenberg | G06F 16/9535 707/999.005 |
| 2009/0012991 | A1* | 1/2009 | Johnson | G06Q 30/0603 |
| 2010/0088726 | A1* | 4/2010 | Curtis | G11B 27/034 725/45 |
| 2010/0228611 | A1* | 9/2010 | Shenfield | G06Q 30/0241 715/234 |
| 2012/0219191 | A1* | 8/2012 | Benzarti | G06Q 30/0201 709/204 |
| 2013/0262483 | A1* | 10/2013 | Blom | G06F 16/9535 707/E17.058 |
| 2014/0180760 | A1* | 6/2014 | Karatzoglou | G06Q 30/0269 705/7.29 |
| 2018/0032882 | A1* | 2/2018 | Joshi | G06N 20/00 |
| 2018/0349477 | A1* | 12/2018 | Jaech | G06F 16/3334 |

FOREIGN PATENT DOCUMENTS

| | | |
|---|---|---|
| CN | 107341242 A | 11/2017 |
| CN | 107679242 A | 2/2018 |
| CN | 108197629 A | 6/2018 |
| CN | 108572981 A | 9/2018 |
| CN | 110209905 A | 9/2019 |

OTHER PUBLICATIONS

Hao Wen, "Research and Implementation of Recommendation Algorithm Based on Tensor Decomposition Combined and Fusion of Context", China Master's Theses Full-text Database, Information Science and Technology, Beijing University of Posts and Telecommunications, Nov. 15, 2018, ISSN: 1074-0246.

Tencent Technology, ISR, PCT/CN2019/126819, Mar. 20, 2020, 3 pgs.

Steffen Rendle, "Pairwise Interaction Tensor Factorization for Personalized Tag Recommendation", Feb. 6, 2010, 10 pgs., Retrieved from the Internet: https://dl.acm.org/doi/pdf/10.1145/1718487.1718498.

Tencent Technology, WO, PCT/CN2019/126819, Mar. 20, 2020, 7 pgs.

Tencent Technology, IPRP, PCT/CN2019/126819, Jun. 16, 2021, 8 pgs.

* cited by examiner

TAG RECOMMENDING METHOD AND APPARATUS, COMPUTER DEVICE, AND READABLE MEDIUM

CROSS REFERENCE TO RELATED APPLICATIONS

This application is a continuation application of PCT Patent Application No. PCT/CN2019/126819, entitled "LABEL RECOMMENDATION METHOD AND APPARATUS, COMPUTER DEVICE, AND READABLE MEDIUM" filed on Dec. 20, 2019, which claims priority to Chinese Patent Application No. 201811562385.5, filed with the State Intellectual Property Office of the People's Republic of China on Dec. 20, 2018, and entitled "TAG RECOMMENDING METHOD AND APPARATUS, AND READABLE MEDIUM", all of which are incorporated herein by reference in their entirety.

FIELD OF THE TECHNOLOGY

Embodiments of this application relate to the field of tag recommendation, and in particular, to a tag recommending method and apparatus, a computer device, and a readable medium.

BACKGROUND OF THE DISCLOSURE

Personalized tags are a form in which users mark resources by using tags in a tag library. The resource may be data in any form, for example, music, a video, a product in a shopping application program, or a picture. A personalized tag recommending system is configured to recommend candidate tags for marking a resource to a user when displaying the resource. The user may preferentially select one or more tags from the candidate tags for marking, or may select another tag from the tag library for marking.

In the related art, interaction relationships among three dimensions: a user, a resource, and a tag, that are related to marking the resource with the tag are usually analyzed by using a Tucker decomposition (TD) model. However, a core tensor obtained through decomposition of the TD model is still a three-dimensional tensor, hence time complexity of the TD model in training and prediction is relatively high, and a duration consumed in the training and prediction is also relatively long, which cannot adapt to a feature that a volume of at least one of user data, resource data, and tag data in an existing network environment is relatively large, that is, cannot be applicable to a scenario in which a data set is relatively large.

SUMMARY

According to various embodiments provided in this application, a tag recommending method and apparatus, a computer device, and a readable medium are provided.

A tag recommending method is provided. The method is performed by a computer device, and includes:

obtaining a target account and a target resource for which tag recommendation is to be performed;

determining, by using a tag recommending model obtained after tensor decomposition, recommendation values of tags in tag data respectively corresponding to the target account and the target resource, the tag recommending model defining correspondences among account data including the target account, resource data including the target resource and the tag data; and determining n tags with highest recommendation values in the tag data as tags to be recommended to the target account, the n tags being used for marking the target resource, and n being a positive integer.

A tag recommending apparatus is provided, and includes:

an obtaining module, configured to obtain a target account and a target resource for which the tag recommendation is to be performed;

a determining module, configured to: determine, by using a tag recommending model obtained after tensor decomposition, recommendation values of tags in tag data respectively corresponding to the target account and the target resource, the tag recommending model defining correspondences among account data including the target account, resource data including the target resource and the tag data; and the determining module, further configured to determine n tags with highest recommendation values in the tag data as tags to be recommended to the target account, the n tags being used for marking the target resource, and n being a positive integer.

A computer device is provided, including a memory and a processor, the memory storing computer-readable instructions, the computer-readable instructions, when executed by the processor, causing the processor to perform the operations of the foregoing tag recommending method.

A non-transitory computer-readable storage medium storing computer-readable instructions is provided, the computer-readable instructions, when executed by one or more processors, causing the one or more processors to perform the operations of the foregoing tag recommending method.

Details of one or more embodiments of this application are provided in the accompanying drawings and description below. Other features, objectives, and advantages of this application become apparent from the specification, the accompanying drawings, and the claims.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show only some embodiments of this application, and a person of ordinary skill in the art may still derive other accompanying drawings according to the accompanying drawings without creative efforts.

DESCRIPTION OF EMBODIMENTS

Figure 1:
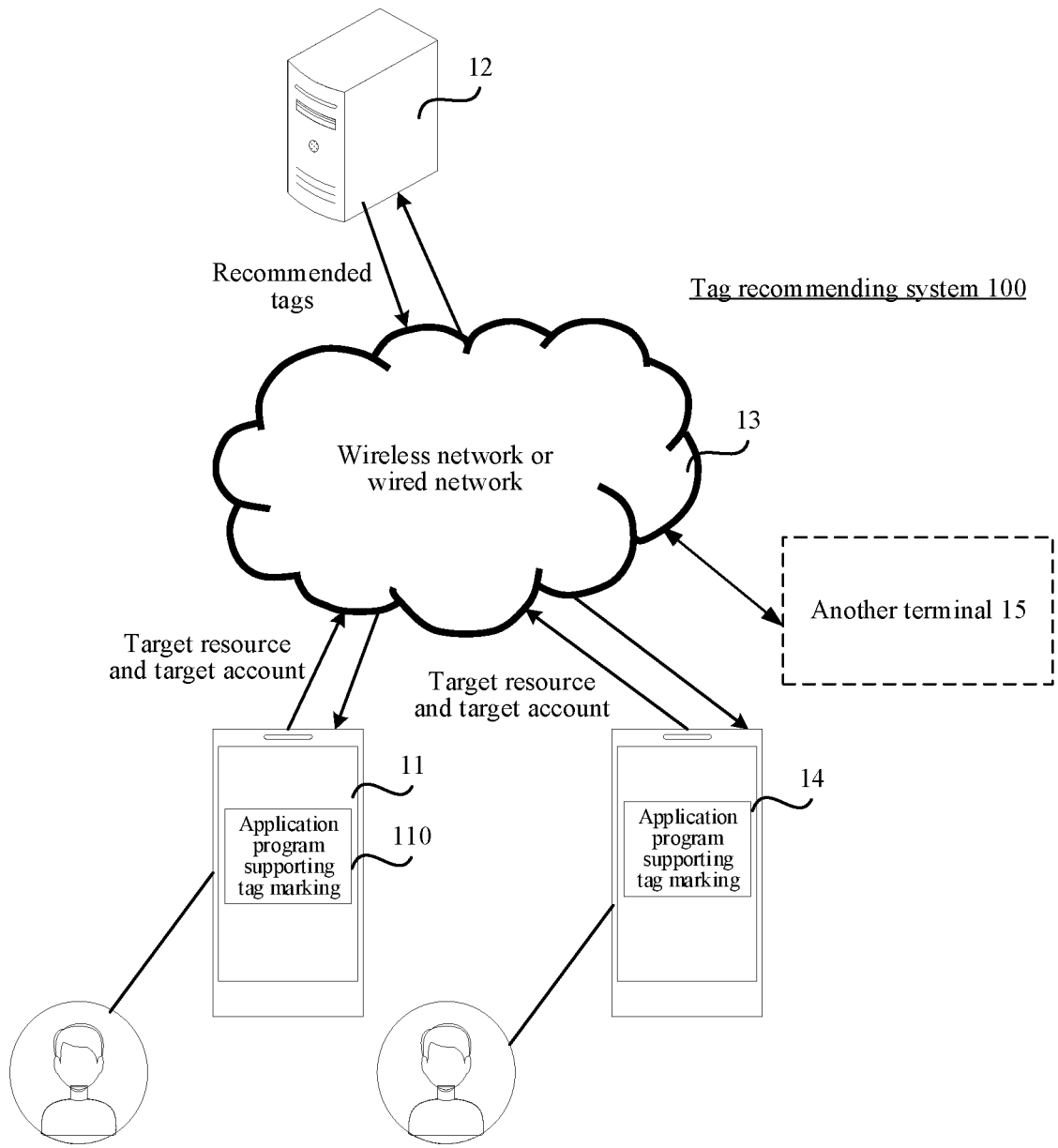
FIG. 1 is a structural diagram of a tag recommending system according to an exemplary embodiment of this application.

To make the objectives, technical solutions, and advantages of this application clearer, the following further describes implementations of this application in detail with reference to the accompanying drawings. It is to be understood that the specific embodiments described herein are merely used for describing this application, but are not intended to limit this application.

First, terms described in this application are briefly introduced:

Tensor: a multi-linear function used for representing a linear relationship among a vector, a scalar, and another tensor. A one-dimensional tensor is referred to as a vector, a two-dimensional tensor is referred to as a matrix, and usually a three- or higher-dimensional tensor is simply referred to as a tensor. In some embodiments, a dimension of a tensor is related to a quantity of data types included by the tensor. For example, in a case that a tensor includes account data, resource data and tag data, the tensor is a three-dimensional tensor. In embodiments of this application, description is made by using the three-dimensional tensor as an example.

Tensor decomposition: a manner of decomposing a tensor into a plurality of parts. The tensor decomposition manner at least includes canonical decomposition (CD), TD, and pairwise interaction tensor factorization (PITF). CD simplifies a TD model by transforming a core tensor of a tensor into a special superdiagonal tensor, TD is a decomposition manner in which a tensor is decomposed into a core tensor and factor matrices, and PITF is a decomposition manner in which a tensor is decomposed into a core tensor and factor matrices of which all parameters on the main diagonals are 1 and other parameters are 0.

When a tensor is decomposed in the foregoing TD manner, a core tensor obtained through decomposition is still a three-dimensional core tensor, and the core tensor still considers an interaction relationship among three dimensions, and thus, time complexity of model training and application is relatively high; and a solution obtained by decomposing three-dimensional data in the CD manner does not necessarily exist. That is, after the decomposition, an equation relationship among a tensor, a core tensor, and factor matrices is transformed into a scalar form and expressed as a function relationship, a case that unknown parameters in the function relationship cannot be solved exists, resulting in a failure of tensor decomposition. However, in the PITF manner, only an interaction relationship between each two dimensions of data in three-dimensional data is retained in a dimension reduction process, and an interaction relationship of an entirety of the three-dimensional data is lost, and thus, accuracy of tag recommendation is relatively low during model application.

In some embodiments, for disadvantages of the foregoing tensor decomposition manners: TD, CD, and PITF, in this embodiment of this application, pairwise interaction tensor decomposition (PITD) is provided. The PITD is a decomposition manner in which a target tensor is decomposed into a core tensor and factor matrices, and the core tensor includes n subtensors. The n subtensors include target subtensors, and the target tensor is obtained by multiplying the target subtensors and the factor matrices correspondingly.

System data: data stored in a system and used for tag recommendation. In some embodiments, the system data includes account data, resource data, and tag data. The account data includes registered or generated accounts in the system, the resource data includes available resources provided in the system, and the tag data includes tags for marking resources. In some embodiments, correspondences among an account in the account data, a resource in the resource data, and a tag in the tag data include at least one of the following relationships: 1. the account uses the resource; 2. the tag marks the resource; 3. the account marks the resource by using the tag. For example, the system data is system data of a music application program, and the system data includes account data of applying the music application program, music data provided in the music application program, and tags for marking music. For example, the account data includes an account A, an account B, and an account C, the music data includes music a, music b, and music c, and the tag data includes a tag "popular", a tag "classic", and a tag "rock". Description is made by using the account A as an example. The account A may listen to the music a, the music b, or the music c in the music application program. In some embodiments, the account A has permission to listen to all of the music a, the music b, and the music c. In some embodiments, description is made by using an example in which the account A listens to the music b. When a user listens to the music b in the music application program to which the account A is logged in, a tag may be selected from the tag data (that is, a tag library) to mark the music b. For example, the tag "rock" is selected from the tag data to mark the music b.

Then, application scenarios involved in a tag recommending method provided in this application are introduced.

The tag recommending method provided in this application is applicable to a scenario in which candidate tags for marking a resource are provided to a user. The scenario includes at least the following cases:

For example, the tag recommending method is applied to a music playing application program, and system data is stored in a server of the music playing application program. The system data includes account data, resource data, and tag data. The server further stores a tag recommending model obtained after tensor decomposition. The tag recommending model is obtained according to the account data, the resource data, and the tag data. When using the music playing application program in a terminal in which the music playing application program is installed, the user logs in to an account a, and selects to play music A. After the terminal transmits the account a and the music A to the server, the server predicts, according to the account a and the music A and by using the tag recommending model obtained after the tensor decomposition, a tag in the tag data used by the user for marking the music A, obtains n tags with highest recommendation values through prediction, and transmits the n tags to the terminal. After receiving the n tags with highest recommendation values, the terminal presents the n tags. The user may select a tag from the n tags to mark the music A, or may select another tag from the tag data to mark the music A.

The foregoing application scenario is an exemplary example. In an actual operation, the tag recommending method provided in the embodiments of this application can be used in all application scenarios in which tags are recommended by using a tag recommending model obtained after tensor decomposition. This is not limited in the embodiments of this application.

In some embodiments, the tag recommending method provided in the embodiments of this application may be independently implemented in a computer device, or may be implemented in an implementation environment including a terminal and a server. When the tag recommending method provided in the embodiments of this application is independently implemented in a computer device, the computer device may be a terminal, or a server. The computer device stores the foregoing system data. The computer device obtains, from the tag data according to a target account in the account data and a target resource in the resource data in the foregoing system data, n tags with highest recommendation values as candidate tags of the target account for marking the target resource.

In some embodiments, when the tag recommending method provided in the embodiments of this application is implemented in an implementation environment including a terminal and a server, refer to FIG. 1. FIG. 1 is a schematic structural diagram of a tag recommending system 100 according to an exemplary embodiment of this application. As shown in FIG. 1, the tag recommending system 100 includes a terminal 11 and a server 12.

An application program 110 providing resource data to a user is installed in the terminal 11. The application program 110 is a program supporting tag marking. At least one account is logged in to the application program 110 in the terminal 11. The user may use resources in the application program 110 by using the logged-in account. In some embodiments, the account logged in to the terminal 11 may be an account registered in the application program 110, or may be an account automatically generated by the application program 110 according to a terminal identification code of the terminal 11, or may further be an account registered in another application program and authorized to log in to the application program 110. This is not limited in this embodiment of this application.

In some embodiments, the resource data provided in the application program 110 is obtained by the terminal 11 from the server 12 by using the application program 110. The server 12 stores system data. The system data includes account data of applying the application program 110 or another associated application program, resource data provided by the application program 110 to a user, and tag data corresponding to a tag with which the user may mark the resource data.

In some embodiments, the terminal 11 correspondingly transmits a target account to which the terminal 11 logs in and a selected target resource to the server 12, and the server 12 generates n recommended tags according to the received target account and the received target resource, and returns the n recommended tags to the terminal 11. The n tags are tags recommended by the server for marking the target resource to the terminal.

In some embodiments, the terminal 11 may be a mobile terminal, for example, a mobile phone, a tablet computer, or a portable laptop computer, or may be a desktop terminal. The server 12 may be one server, or may be a server cluster formed by a plurality of server devices. The server 12 may be a physical server, or may be a virtual cloud server. This is not limited in the embodiments of this application.

In some embodiments, the terminal 11 is connected to the server 12 by using a communication network 13. The communication network 13 may be a wired network or may be a wireless network.

A person skilled in the art may learn that there may be more or fewer terminals 11. For example, there may be only one terminal, or there may be dozens of or hundreds of or more terminals. In this case, the computer system further includes a terminal 14 and another terminal 15. In some embodiments, when the application program 110 is an instant messaging application program, a friend account having a friend relationship with the target account is logged in to the terminal 14. The quantity and the device types of the terminals are not limited in the embodiments of this application.

Figure 2:
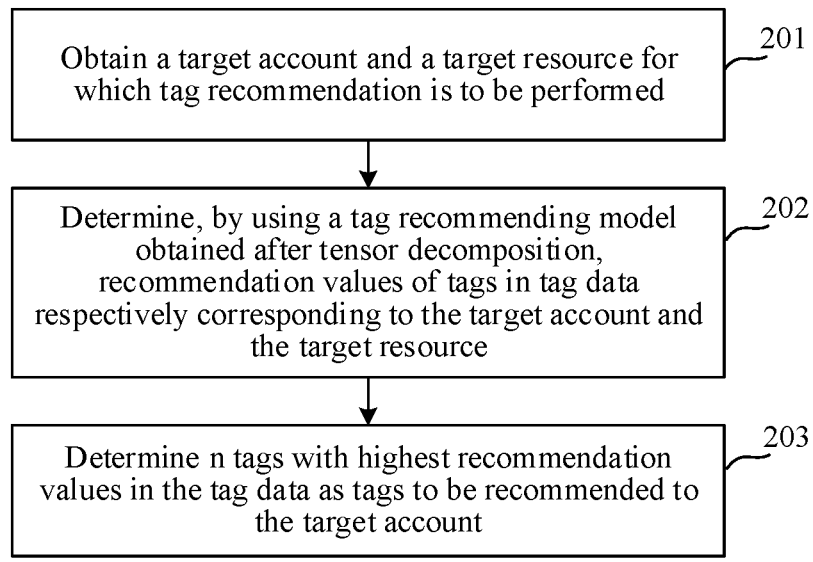
FIG. 2 is a flowchart of a tag recommending method according to an exemplary embodiment of this application.

FIG. 2 is a flowchart of a tag recommending method according to an exemplary embodiment of this application. The description is made with reference to an example in which the method is applied to the server 12 shown in FIG. 1. As shown in FIG. 2, the method includes the following steps:

Step 201. Obtain a target account and a target resource for which tag recommendation is to be performed.

In some embodiments, a manner of obtaining the target account and the target resource includes at least one of the following manners:

First, when the method is applied to an implementation environment including a terminal and a server, the terminal is logged in with the target account. When the user uses the target resource by using the target account logged in to the terminal, a correspondence between the target account and the target resource is generated, and the target account and the target resource are transmitted to the server. The server obtains the target account and the target resource, and performs tag recommendation on the target account for the target resource. The process in which the user uses the target resource by using the target account logged in to the terminal may further be implemented as that: the user selects a tag marking function for the target resource by using the target account. For example, after selecting the target resource by using the target account, the user selects "marking the target resource with a tag" to implement the foregoing tag marking function.

For example, the server receives the target account and the target resource uploaded by the terminal. A video application program is installed in the terminal, the target account is an account logged in to the video application program, and the target resource is a video resource currently played on the terminal. That is, when a user views the video resource in the video application program by using the target account, the terminal transmits a correspondence between the target account and the video resource to the server, and the server recommends a tag marked on the video resource to the target account.

Second, when the method is applied to a single-side computer device, the target account and the target resource may be inputted to the computer device in an input manner. In some embodiments, the input manner includes at least one of manners of inputting the target account and the target resource by using an external input device and inputting a speech by using a microphone.

In some embodiments, the target account and the target resource correspond to data in system data, and the system data includes account data, resource data, and tag data. In some embodiments, the account data includes the foregoing target account, and the resource data includes the foregoing target resource.

In some embodiments, a tag recommending model is pre-generated according to the account data, the resource data, and the tag data. The tag recommending model is a three-dimensional tensor, where the three dimensions in the three-dimensional tensor respectively correspond to the account data, the resource data, and the tag data. In some embodiments, the tag recommending model is configured to determine correspondences among the account data, the resource data, and the tag data.

Step 202. Determine, by using a tag recommending model obtained after tensor decomposition, recommendation values of tags in tag data respectively corresponding to the target account and the target resource.

In some embodiments, the target account and the target resource have a correspondence, and a recommendation value of each of the tags in the tag data corresponding to the correspondence is determined by using the tag recommending model obtained after tensor decomposition.

In some embodiments, the tag recommending model is decomposed into a core tensor and factor matrices after the tensor decomposition, and the tag recommending model is equal to a product of the core tensor and the factor matrices. For example, the tag recommending model is decomposed into one core tensor and three factor matrices.

In some embodiments, the tag recommending model obtained after tensor decomposition, the core tensor, and the factor matrices correspond to an equation relationship. In some embodiments, the tag recommending model is equal to a product of the core tensor and the factor matrices.

The core tensor includes n subtensors, target subtensors in the n subtensors are correspondingly multiplied by the factor matrices in the equation relationship, and elements in subtensors in the n subtensors other than the target subtensors are 0.

Figure 3:
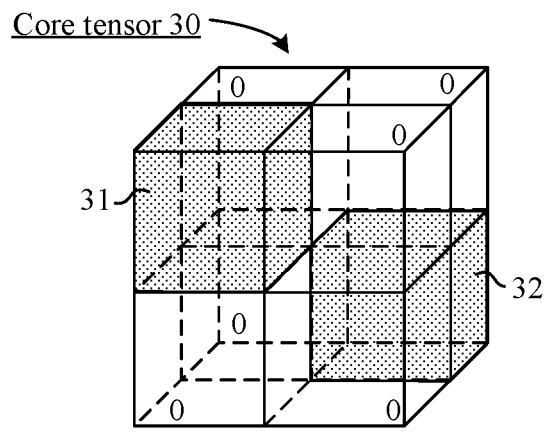
FIG. 3 is a schematic diagram of a splitting method of a core tensor according to the embodiment shown in FIG. 2.

In some embodiments, the target subtensors include a first subtensor and a second subtensor, the first subtensor and the second subtensor being subtensors located on a main diagonal in cubic-arranged 2*2*2 subtensors obtained after horizontal splitting and vertical splitting are performed on the core tensor. For example, FIG. 3 shows a splitting result that a core tensor 30 is split into 8 subtensors. As shown in FIG. 3, a subtensor 31 marked with shadow on a main diagonal is a first subtensor, and a subtensor 32 marked with shadow on the main diagonal is a second subtensor, that is, subtensors that are correspondingly multiplied by a factor matrix in an equation relationship.

In some embodiments, for the foregoing splitting manner of the core tensor, description is made by using an example in which the core tensor 30 is horizontally and vertically equally split in FIG. 3. In an actual operation, when the core tensor 30 is split, a horizontal splitting ratio and a vertical splitting ratio may be different or may be the same.

In some embodiments, the factor matrices include a first matrix corresponding to the account data, a second matrix corresponding to the resource data, and a third matrix corresponding to the tag data, the first matrix includes an account matrix and a first digital matrix spliced row-wise, the second matrix includes a second digital matrix and a resource matrix spliced row-wise, and the third matrix includes a first tag matrix and a second tag matrix spliced row-wise, where the first digital matrix and the second digital matrix are matrices with elements being 1. In some embodiments, a row-wise width of the first digital matrix is consistent with a row-wise width of the account matrix, and a column-wise height of the first digital matrix is consistent with a column-wise height of the account matrix; and a row-wise width of the second digital matrix is consistent with a row-wise width of the resource matrix, and a column-wise height of the second digital matrix is consistent with a column-wise height of the resource matrix.

In some embodiments, the splitting manner of the foregoing core tensor is related to matrix sizes of the first matrix, the second matrix, and the third matrix. In some embodiments, a column-wise height of the first matrix corresponds to a quantity of accounts in the account data, a column-wise height of the second matrix corresponds to a quantity of resources in the resource data, and a column-wise height of the third matrix corresponds to a quantity of tags in the tag data. In some embodiments, the splitting manner of the core tensor corresponds to a row-wise width of the first matrix, a row-wise width of the second matrix, and a row-wise width of the third matrix.

In some embodiments, according to the equation relationship among the tag recommending model, the core tensor, and the factor matrices, and the first matrix, the second matrix, and the third matrix that are included in the foregoing factor matrices, an obtained equation relationship among the tag recommending model, the core tensor, the first matrix, the second matrix, and the third matrix is as the following Formula 1:

$$\hat{Y}=C\times_U[U\oplus 1]\times_I[1\oplus I]\times_T[T^U\oplus T^I] \quad \text{Formula 1:}$$

Figure 4:
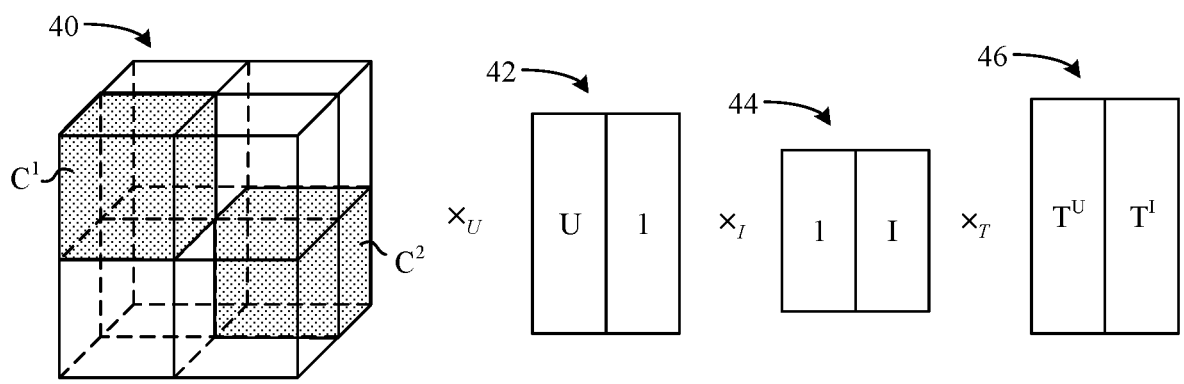
FIG. 4 is a schematic diagram of a product relationship between the core tensor and factor matrices according to the embodiment shown in FIG. 2.

$\hat{Y}$ is used for representing a three-dimensional tensor corresponding to the tag recommending model, C is used for representing the core tensor obtained through decomposition, and $[U\oplus 1]$ is used for representing the first matrix corresponding to the foregoing account data, where, the foregoing symbol $\oplus$ is used for representing a splicing relationship between matrices, U s used for representing the foregoing account matrix, 1 spliced with U is used for representing the first digital matrix, and $[1\oplus I]$ is used for representing the second matrix corresponding to the foregoing resource data, where 1 spliced with I is used for representing the second digital matrix, I is used for representing the foregoing resource matrix, and $[T^U\oplus T^I]$ is used for representing the third matrix corresponding to the foregoing tag data, where $T^U$ is used for representing the first tag matrix, and $T^I$ is used for representing the second tag matrix. In some embodiments, the splicing relationship is an order splicing relationship. In some embodiments, by using an operator $\times_U$ as an example, $\times_U$ is an operator representing a multiplication operation of a tensor and a factor matrix, and a subscript U represents an unfolding direction of the tensor when the tensor is multiplied by the factor matrix. For example, FIG. 4 is a schematic diagram for demonstrating a product relationship among the core tensor 40, the first matrix 42, the second matrix 44, and the third matrix 46 described above, where the core tensor 40 includes a first subtensor C1 and a second subtensor C2.

Formula 2 is obtained by expanding Formula 1:

$$\hat{Y}=C^1\times_U U\times_I 1\times_T T^U+C^2\times_U 1\times_I I\times_T T^I \quad \text{Formula 2:}$$

the three-dimensional tensor corresponding to the tag recommending model is equal to a sum of a first product of the first subtensor C1, the account matrix, the second digital matrix 1 and the first tag matrix $T^U$, and a second product of the second subtensor C2, the first digital matrix 1, the resource matrix I and the second tag matrix $T^I$, where the first subtensor C1 corresponds to the account matrix U and the first tag matrix $T^U$ in the equation relationship, and the second subtensor C2 corresponds to the resource matrix I and the second tag matrix $T^I$ in the equation relationship.

Step 203. Determine n tags with highest recommendation values in the tag data as tags to be recommended to the target account.

In some embodiments, the n tags are candidate tags for marking the target resource, n being a positive integer.

In some embodiments, after determining the n tags, the server transmits the n tags to the terminal as candidate marking tags of the target resource. For example, by using the video application program in step 201 as an example, the terminal is configured for viewing video resources marked with the same tag in the video application program. In some embodiments, tags marked by each account on the same video resource may be different. When the video resource is marked with a relatively large quantity of types of tags, m tags marked on the video resource for largest quantities of times are determined as tags for marking the video resource.

For example, a target account is logged in to the video application program, and a video 1 is played in the video application program. After determining the n tags, the server transmits the n tags to the terminal. The n tags are used for marking the video 1. For example, the server transmits 3 tags to the terminal, namely "humor" "chicken soup", and "beauty makeup", and the terminal may select the tag "humor" for marking the video 1. In some embodiments, the video 1 is marked with the tag "humor" for 20 times, "chicken soup" for 12 times, and "beauty makeup" for 18 times, and finally two tags with largest quantities of marking times, namely "humor" and "beauty makeup" are determined as tags of the video 1.

In some embodiments, the terminal may view all video resources marked with "humor" in the video application program, or may view all video resources marked with the tag "beauty makeup", or may view all video resources marked with the tag "chicken soup".

In some embodiments, after transmitting the n tags to the terminal, the server receives a tag selected signal transmitted by the terminal, the tag selected signal is a signal transmitted by the terminal after a target marking tag in candidate marking tags of the video resource is selected, and the server stores correspondences among the target account, the video resource, and the target marking tag into system data according to the tag selected signal.

In conclusion, in the tag recommending method provided in this embodiment, in the process of recommending a tag by using the tag recommending model, the tag recommending model is decomposed into a core tensor and factor matrices after tensor decomposition, and elements in subtensors in the core tensor other than the target subtensors are 0. That is, in an equation relationship, only parts corresponding to the target subtensors in the core tensor are involved in the equation relationship, and remaining parts are not involved in the equation relationship, thereby avoiding a problem of excessively high time complexity caused by a complete three-dimensional core tensor participating in training and application, reducing redundant calculation processes, decreasing time complexity of a process of training and application, and improving tag recommendation efficiency.

Figure 5:
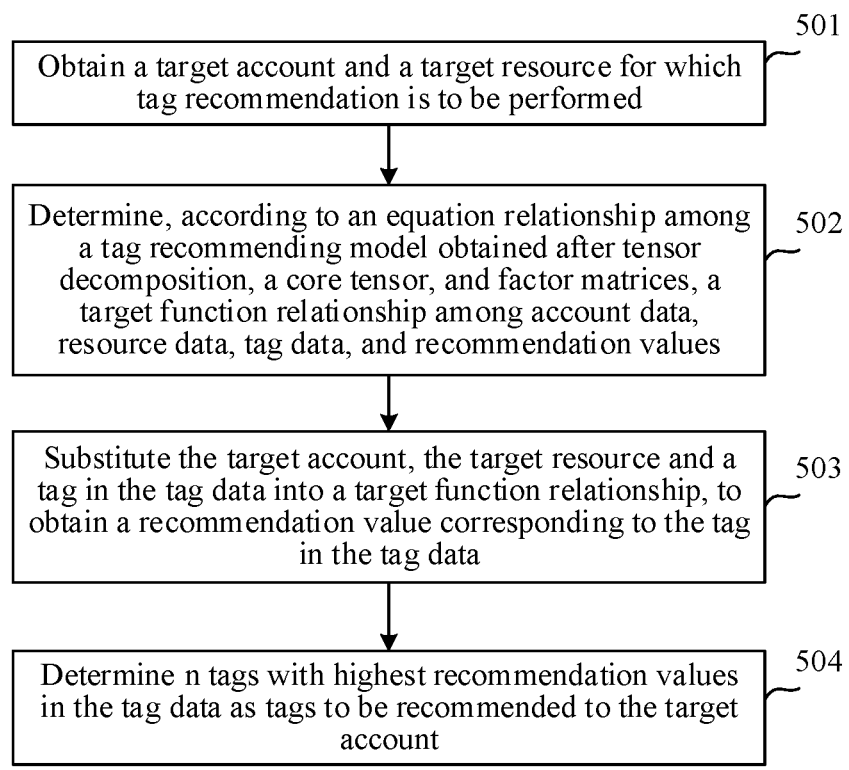
FIG. 5 is a flowchart of a tag recommending method according to another exemplary embodiment of this application.

In some embodiments, when recommendation values of tags are determined by using the foregoing equation relationship, the foregoing equation relationship needs to be transformed into a function relationship among account data, resource data, tag data, and the recommendation values. Referring to FIG. 5, FIG. 5 is a flowchart of a tag recommending method according to an exemplary embodiment of this application. As shown in FIG. 5, description is made by using an example in which the method is applied to the server 12 shown in FIG. 1. The method includes the following steps:

Step 501. Obtain a target account and a target resource for which tag recommendation is to be performed.

For contents related to obtaining the target account and the target resource, refer to step 201 in FIG. 2.

Step 502. Determine, according to an equation relationship among a tag recommending model obtained after tensor decomposition, a core tensor, and factor matrices, a target function relationship among account data, resource data, tag data, and recommendation values.

In some embodiments, the tag recommending model is decomposed into a core tensor and factor matrices after tensor decomposition, and the tag recommending model is equal to a product of the core tensor and the factor matrices, where the core tensor includes n subtensors, target subtensors in the n subtensors are correspondingly multiplied by the factor matrices in an equation relationship, and elements in subtensors in the n subtensors other than the target subtensors are 0.

In some embodiments, the target subtensors include a first subtensor and a second subtensor, the first subtensor and the second subtensor being subtensors located on a main diagonal in cubic-arranged 2*2*2 subtensors obtained after horizontal splitting and vertical splitting are performed on the core tensor.

In some embodiments, the factor matrices include a first matrix corresponding to the account data, a second matrix corresponding to the resource data, and a third matrix corresponding to the tag data, the first matrix includes an account matrix and a first digital matrix spliced row-wise, the second matrix includes a second digital matrix and a resource matrix spliced row-wise, and the third matrix includes a first tag matrix and a second tag matrix spliced row-wise, where the first digital matrix and the second digital matrix are matrices with elements being 1.

In some embodiments, a row-wise width of the account matrix is consistent with a row-wise width of the first digital matrix, a row-wise width of the resource matrix is consistent with a row-wise width of the second digital matrix, and a row-wise width of the first tag matrix is consistent with a row-wise width of the second tag matrix.

In some embodiments, the target function relationship is a function relationship among the account data, the resource data, the tag data, and the recommendation values obtained by transforming the equation relationship into a scalar form. In some embodiments, with reference to the equation relationship provided in Formula 1 in step 203, by using $C \times_U U$ as an example, an operation manner of the operator is described, and $Y = C \times_U U$ is represented as the following Formula 3 in a scalar form:

$$Y_{u,i,t} = \sum_{u'=1}^{k_u} C_{u',i,t} \cdot U_{u,u'} \qquad \text{Formula 3}$$

where u represents an account in the account data, i represents resources in the resource data, and t represents tags in the tag data. $k_u$ represents the row-wise width of the account matrix in the first matrix, $C_{u',i,t}$ represents elements <u', i, t> in the core tensor, and $U_{u,u'}$ represents elements <u, u'> in the account matrix, where a value of u' is from 1 to $k_u$, and after values of u' are traversed, a sum of products of all $C_{u',i,t}$ and $U_{u,u'}$ is obtained.

An equation relationship expressed in a scalar form is obtained by substituting Formula 3 into Formula 2, as shown in Formula 4:

$$\hat{y}_{u,i,t} = \sum_{u'}\sum_{i'}\sum_{t'} c^1_{u',i',t'} \cdot u_{u,u'} \cdot 1_{i,i'} \cdot t^U_{t,t'} + \qquad \text{Formula 4}$$

$$\sum_{u'}\sum_{i'}\sum_{t'} c^2_{u',i',t'} \cdot 1_{u,u'} \cdot i_{i,i'} \cdot t^I_{t,t'}$$

In some embodiments, the foregoing summation symbol $$\sum_{u'}\sum_{i'}\sum_{t'}$$

is a summation symbol in a short form, where a value of u' is from 1 to $K_u$, a value of i' is from 1 to $K_i$, and a value of t' is from 1 to $K_t$. In some embodiments, the foregoing values of $K_u$, $K_i$, and $K_t$ may be preset, or may be obtained by training the existing historically marked data in system data. $\hat{y}_{u,i,t}$ is used for representing a recommendation value of a tag t marked on a target resource i for a target account u.

For step 501 and step 502, step 501 may be performed first and then step 502 is performed. Alternatively, step 502 may be performed first and then step 501 is performed. This is not limited in this embodiment of this application.

Step 503. Substitute the target account, the target resource and a tag in the tag data into a target function relationship, to obtain a recommendation value corresponding to the tag in the tag data.

In some embodiments, after the target account used as u, the target resource used as i, and the tag in the tag data used as t are substituted into the target function relationship provided in Formula 4, a recommendation value y of the tag t is obtained.

Step 504. Determine n tags with highest recommendation values in the tag data as tags to be recommended to the target account.

In some embodiments, the n tags are used for marking the target resource, n being a positive integer.

In conclusion, in the tag recommending method provided in this embodiment, in the process of recommending a tag by using the tag recommending model, the tag recommending model is decomposed into a core tensor and factor matrices after tensor decomposition, and elements in subtensors in the core tensor other than the target subtensors are 0. That is, in an equation relationship, only parts corresponding to the target subtensors in the core tensor are involved in the equation relationship, and remaining parts are not involved in the equation relationship, thereby avoiding a problem of excessively high time complexity caused by a complete three-dimensional core tensor participating in training and application, reducing redundant calculation processes, decreasing time complexity of a process of training and application, and improving tag recommendation efficiency.

Through the method provided in this embodiment, the first subtensor in the core tensor is correspondingly multiplied by the account matrix, the second digital matrix, and the first tag matrix, and the second subtensor in the core tensor is correspondingly multiplied by the first digital matrix, the resource matrix, and the second tag matrix. That is, in the equation relationship, an interaction relationship between the account data and the resource data is omitted, and user data and the resource data are considered to have a correspondence, thereby avoiding problems that interaction relationships among three-dimensional data are relatively complex, and time complexity is relatively high in a process of training and applying the tag recommending model.

In some embodiments, values of the foregoing $k_u$, $k_i$, and $k_t$ may be obtained by training the existing historically marked data in the system data, that is, $C^1$, $C^2$, U, I, $T^U$ and $T^I$ in Formula 2 are obtained by training the historically marked data, and the historically marked data includes a historically marked record of an account in the account data for a resource in the resource data.

Figure 6:
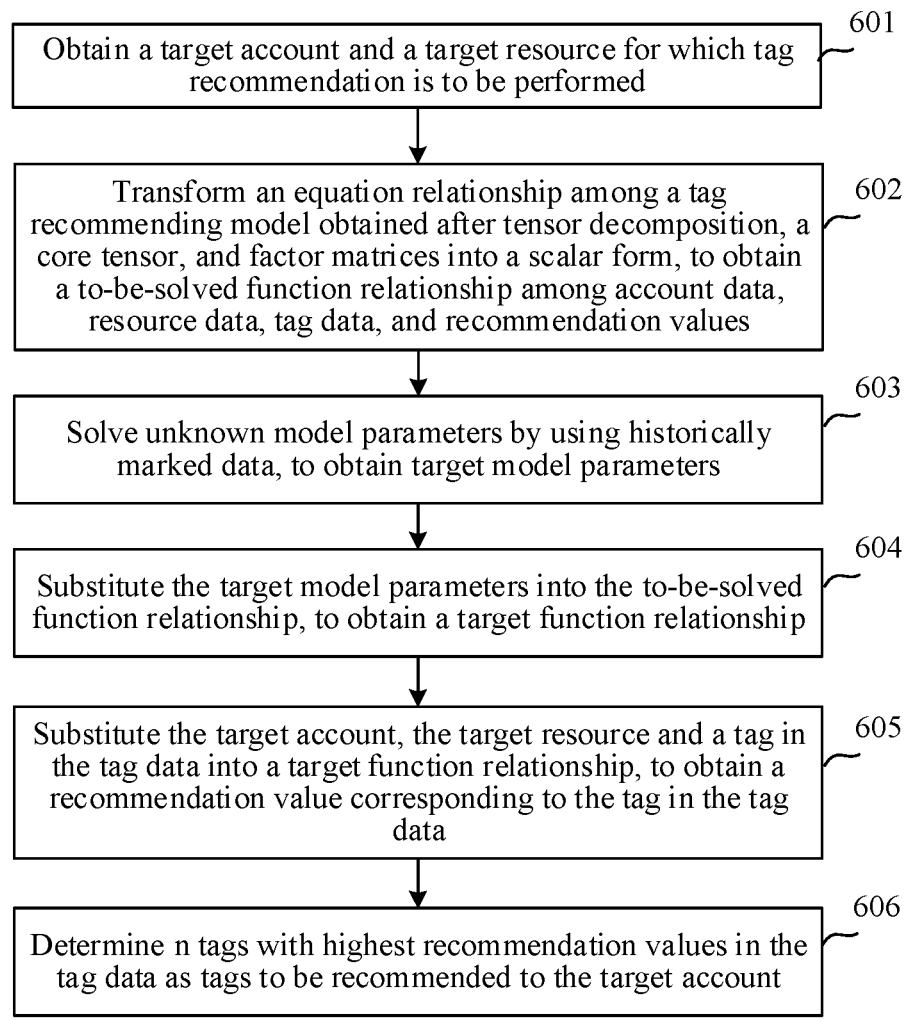
FIG. 6 is a flowchart of a tag recommending method according to another exemplary embodiment of this application.

FIG. 6 is a flowchart of a tag recommending method according to another exemplary embodiment of this application. As shown in FIG. 6, description is made by using an example in which the method is applied to the server shown in FIG. 1. The method includes the following steps:

Step 601. Obtain a target account and a target resource for which tag recommendation is to be performed.

For contents related to obtaining the target account and the target resource, refer to step 201 in FIG. 2.

Step 602. Transform an equation relationship among a tag recommending model obtained after tensor decomposition, a core tensor, and factor matrices into a scalar form, to obtain a to-be-solved function relationship among account data, resource data, tag data, and recommendation values.

In some embodiments, the to-be-solved function relationship includes unknown model parameters. In some embodiments, the unknown model parameters are $C^1$, $C^2$, U, I, $T^U$ and $T^I$ in Formula 2. In some embodiments, the unknown model parameters include a first parameter used for representing a row-wise width of the account matrix and the first digital matrix, a second parameter used for representing a row-wise width of the second digital matrix and the resource matrix, and a third parameter used for representing a row-wise width of the first tag matrix and the second tag matrix.

In some embodiments, the to-be-solved function relationship is a function relationship when $C^1$, $C^2$, U, I, $T^U$ and $T^I$ in Formula 2 are in an unknown state, that is, a function relationship that the values of $K_u$, $K_i$ and $K_t$ in Formula 4 are in an unknown state during scalar expression.

Step 603. Solve the unknown model parameters by using historically marked data, to obtain target model parameters.

In some embodiments, when the unknown model parameters are solved by using the historically marked data, the maximum a posteriori estimation algorithm is used, that is, for a given p (u, i), a value of the following Formula 5 is maximized by optimizing a model parameter θ:

$$p(\theta|>_{u,i}) \propto p(>_{u,i}|\theta) \cdot p(\theta) \qquad \text{Formula 5:}$$

the model parameter θ is used for entirely representing $C^1$, $C^2$, U, I, $T^U$ and $T^I$ in Formula 2, that is, $$\arg\max_{\theta} \prod_{(u,i)\in U\times I} p(>_{u,i}|\theta) \cdot p(\theta)$$

is calculated, where $>_{u,i}$ represents a total order relationship obtained by arranging tags in the tag data for a combination <u, i> of a user u and a resource i, where the total order relationship satisfies the following properties:

1. Completeness: $\forall t_1, t_2 \in T$: $t_1 \neq t_2 \Rightarrow t_1 >_{u,i} t_2 \vee t_2 >_{u,i} t_1$.
2. Antisymmetry: $\forall t_1, t_2 \in T$: $t_1 >_{u,i} t_2 \wedge t_2 >_{u,i} t_1 \Rightarrow t_1 = t_2$.
3. Transitivity: $\forall t_1, t_2, t_3 \in T$: $t_1 >_{u,i} t_2 \wedge t_2 >_{u,i} t_3 \Rightarrow t_1 >_{u,i} t_3$.

T represents the tag data, and $t_1$ and $t_2$ are both tags in the tag data. A four tuple (u, i, $t_A$, $t_B$) is defined according to the system data, where the four tuple is used for representing a case that, when marking the resource i with a tag, the account u selects a tag $t_A$, rather than a tag $t_B$. For example, the tag data includes 100 tags, when the account a marks a resource b with a tag, a tag 1 is marked, and then four tuples corresponding to the account a and the resource b are (a, b, 1, 2), (a, b, 1, 3), (a, b, 1, 4), . . . , (a, b, 1, 100), adding up to 99 four tuples.

That is, a training set $D_S$ is obtained according to the four tuple:

$$D_S := \{(u,i,t_A,t_B) | (u,i,t_A) \in S \wedge (u,i,t_B) \notin S\}$$

In a first part, $p(>_{u,i}|\theta)$ in Formula 5 is analyzed, and because $t_A >_{u,i} t_B$ is a Bernoulli trial, the following Formula 6 is obtained:

$$\prod_{(u,i) \in U \times I} p(>_{u,i} | \theta) = \qquad \text{Formula 6}$$
$$\prod_{(u,i,t_A,t_B) \in U \times I \times T^2} p(t_A >_{u,i} t_B | \theta)^{\delta((u,i,t_A,t_B) \in D_S)} \cdot$$
$$(1 - p(t_A >_{u,i} t_B | \theta))^{\delta((u,i,t_B,t_A) \in D_S)}$$

$\delta$ is an indicator function, used for expressing whether a four tuple $(u,i,t_A,t_B)$ is in the training set, and is defined as the following equation:

$$\delta(b) := \begin{cases} 1, & \text{if } b \text{ is valid;} \\ 0, & \text{otherwise.} \end{cases}$$

that is, because the tag data has the total order relationship, a case $(u,i,t_B,t_A) \in D_S$ is not valid. That is, the foregoing Formula 6 may be simplified as the following Formula 7:

$$\prod_{(u,i) \in U \times I} p(>_{u,i} | \theta) = \prod_{(u,i,t_A,t_B) \in D_S} p(t_A >_{u,i} t_B | \theta) \qquad \text{Formula 7}$$

a value of $\delta((u,i,t_A,t_B) \in D_S)$ in Formula 6 is 1, and a value of $\delta((u,i,t_B,t_A) \in D_S)$ is 0.

$p(t_A >_{u,i} t_B | \theta)$ in the foregoing Formula 7 is defined, to obtain the following Formula 8:

$$p(t_A >_{u,i} t_B | \theta) := \sigma(\hat{y}_{u,i,t_A,t_B}(\theta)) \qquad \text{Formula 8:}$$

$\sigma$ is used for representing a logic function $\sigma(x)=1/(1+e^{-x})$, and $\hat{y}_{u,i,t_A,t_B}(\theta)$ is used for representing a preference score of selecting $t_A$ rather than $t_B$ from $t_A$ and $t_B$, when the account u marks the resource i. In some embodiments, the preference score is defined as a difference between a recommendation value of $t_A$ and a recommendation value of $t_B$, that is, the Formula 9 is defined as the follows:

$$\hat{y}_{u,i,t_A,t_B}(\theta) := \hat{y}_{u,i,t_A}(\theta) - \hat{y}_{u,i,t_B}(\theta) \qquad \text{Formula 9:}$$

Formula 8 and Formula 9 are correspondingly substituted into Formula 7, to obtain Formula 10 as follows:

$$\prod_{(u,i) \in U \times I} p(>_{u,i} | \theta) = \prod_{(u,i,t_A,t_B) \in D_S} \sigma(\hat{y}_{u,i,t_A} - \hat{y}_{u,i,t_B}) \qquad \text{Formula 10}$$

In a second part, $p(\theta)$ in Formula 5 is analyzed, assuming that the model parameter $\theta$ conforms to normal distribution with an expected value being 0 and a variance being $\sigma_\theta$, that is, $\theta \sim N(0,\sigma_\theta^2 E)$, where E represents an identity matrix, that is, a matrix with a main diagonal being 1, and other elements being 0.

For a D-dimensional Gaussian distribution with a mean value being 0, and a variance being $\sigma_\theta^2 I$, a probability density function thereof is as the following Formula 11:

$$f(x) = (2\pi)^{-\frac{D}{2}} \cdot (\sigma_\theta^2)^{-\frac{D}{2}} \cdot e^{-\frac{1}{2}[(\sigma_\theta^2)^{-1} x' x]} \qquad \text{Formula 11}$$

According to the foregoing normal distribution expression, and Formula 11, the following Formula 12 may be obtained:

$$\ln p(\theta | \sigma_\theta^2) = \ln\left[\prod_{i=1}^{N} N(\theta_i | 0, \sigma_\theta^2 E)\right] \qquad \text{Formula 12}$$
$$= \sum_{i=1}^{N} \ln\left[(\sigma_\theta^2)^{-\frac{D}{2}} \cdot e^{-\frac{1}{2}[(\sigma_\theta^2)^{-1} \theta_i' \theta_i]}\right] + C_1$$
$$= -\frac{1}{2\sigma_\theta^2} \sum_{i=1}^{N} \theta_i' \theta_i - \frac{1}{2} ND \ln \sigma_\theta^2 + C_1$$

$C_1$ is a constant.

After the foregoing Formula 10 and Formula 12 are substituted into Formula 5, the following Formula 13 is obtained:

$$BPR-OPT := \ln \prod_{(u,i,t_A,t_B) \in D_S} \sigma(\hat{y}_{u,i,t_A,t_B}) \cdot p(\theta) \qquad \text{Formula 13}$$
$$= \sum_{(u,i,t_A,t_B) \in D_S} \ln \sigma(\hat{y}_{u,i,t_A,t_B}) + \ln p(\theta)$$
$$= \sum_{(u,i,t_A,t_B) \in D_S} \ln \sigma(\hat{y}_{u,i,t_A,t_B}) - \frac{1}{2\sigma_\theta^2} \sum_{i=1}^{N} \theta_i' \theta_i - C_2$$
$$= \sum_{(u,i,t_A,t_B) \in D_S} \ln \sigma(\hat{y}_{u,i,t_A} - \hat{y}_{u,i,t_B}) - \lambda_\theta \|\theta\|_F^2$$

where $$\lambda_\theta = 1/2\sigma_\theta^2, \|\theta\|_F^2 = \sum_{i=1}^{N} \theta_i' \theta_i,$$

and $C_2$ are constants, which may be ignored.

With reference to Formula 12 in the foregoing first part, Formula 13 and Formula 5 in the second part, the following Formula 14 may be obtained:

$$\frac{\partial}{\partial \theta}\left(\ln \sigma(\hat{y}_{u,i,t_A,t_B}) - \lambda_\theta \cdot \|\theta\|_F^2\right) \propto \qquad \text{Formula 14}$$
$$(1 - \sigma(\hat{y}_{u,i,t_A,t_B})) \cdot \left(\frac{\partial}{\partial \theta} \hat{y}_{u,i,t_A} - \frac{\partial}{\partial \theta} \hat{y}_{u,i,t_B}\right) - \lambda_\theta \cdot \theta$$

With reference to the foregoing Formula 4 and the foregoing Formula 14, parameters in the tag recommending model are solved for partial derivatives, to obtain the following partial derivative calculation formula:

$$\frac{\partial \hat{y}_{u,i,t}}{\partial c^1_{u',i',t'}} = u_{u,u'} \cdot t^U_{t,t'}, \quad \frac{\partial \hat{y}_{u,i,t}}{\partial c^2_{u',i',t'}} = i_{i,i'} \cdot t^I_{t,t'},$$

$$\frac{\partial \hat{y}_{u,i,t}}{\partial u_{u,u'}} = \sum_{i'}\sum_{t'} c^1_{u',i',t'} \cdot t^U_{t,t'}, \quad \frac{\partial \hat{y}_{u,i,t}}{\partial i_{i,i'}} = \sum_{u'}\sum_{t'} c^2_{u',i',t'} \cdot t^I_{t,t'},$$

$$\frac{\partial \hat{y}_{u,i,t}}{\partial t^U_{t,t'}} = \sum_{u'}\sum_{i'} c^1_{u',i',t'} \cdot u_{u,u'}, \quad \frac{\partial \hat{y}_{u,i,t}}{\partial t^I_{t,t'}} = \sum_{u'}\sum_{i'} c^2_{u',i',t'} \cdot i_{i,i'}$$

after a partial derivative calculation formula of each of the parameters are obtained, the parameters in the tag recommending model are adjusted by using a gradient ascent algorithm. In some embodiments, a preset gradient step and a preset gradient parameter are preset corresponding to the tag recommending system. When the parameters are adjusted by using the gradient ascent algorithm, historically marked data $D_S$, the preset gradient step, and the preset gradient parameter are obtained, and the unknown model parameters are initialized, to obtain initialized model parameters. That is, initial values are assigned to the unknown model parameters. When the unknown model parameters are initialized, the unknown model parameters may be initialized according to a normal distribution relationship. After the historically marked data is sampled to obtain sampled data, and the initialized model parameters are adjusted by using the preset gradient step, the preset gradient parameter, and the sampled data, when partial derivatives corresponding to the adjusted initialized model parameters do not converge, a step of sampling the historically marked data is repeated, until the partial derivatives corresponding to the initialized model parameters converge.

In some embodiments, for the gradient ascent algorithm, refer to the following steps (step 1 to step 21):

Input: $D_S$, $\alpha$ (preset gradient step), and $\lambda$ (preset gradient parameter).

Output: adjusted $C^1$, $C^2$, U, I, $T^U$, and $T^I$.

Step 1. Initialize the unknown model parameters $C^1$, $C^2$, U, I, $T^U$ and $T^I$ by using $N(\theta, \sigma^2 I)$, to obtain the initialized model parameters.

Step 2. Sample $D_S$, to obtain a four tuple (u, i, $t_A$, $t_B$).

Step 3. Substitute the four tuple into Formula 4 and Formula 9, to calculate $\hat{y}_{u,i,t_A,t_B}(\theta)$.

Step 4. $\Gamma \leftarrow (1-\sigma(\hat{y}_{u,i,t_A,t_B}))$.

Step 5. Run a for loop, for $(u',i',t') \in k_u \times k_i \times k_t$ do.

Step 6. $C_{u',i',t'}^1 \leftarrow C_{u',i',t'}^1 + \alpha \cdot (\delta \cdot (u_{u,u'} \cdot (t^U_{t_A,t'} - t^U_{t_B,t'})) - \lambda \cdot C_{u',i',t'}^1)$.

Step 7. $C_{u',i',t'}^2 \leftarrow C_{u',i',t'}^2 + \alpha \cdot (\delta \cdot (i_{u,u'} \cdot (t^I_{t_A,t'} - t^I_{t_B,t'})) - \lambda \cdot C_{u',i',t'}^2)$.

Step 8. End for.

Step 9. Run a for loop, for $(i',t') \in k_i \times k_t$ do.

Step 10.

$$u_{u,u'} \leftarrow u_{u,u'} + \alpha \cdot \left( \delta \cdot \left( \sum_{i'}\sum_{t'} c^1_{u',i',t'} \cdot (t^U_{t_A,t'} - t^U_{t_B,t'}) \right) - \lambda \cdot u_{u,u'} \right)$$

Step 11. End for.
Step 12. Run a for loop, for $(u',i') \in k_u \times k_i$ do.
Step 13.

$$i_{i,i'} \leftarrow i_{i,i'} + \alpha \cdot \left( \delta \cdot \left( \sum_{u'}\sum_{t'} c^1_{u',i',t'} \cdot (t^I_{t_A,t'} - t^I_{t_B,t'}) \right) - \lambda \cdot i_{i,i'} \right)$$

Step 14. End for.
Step 15. Run a for loop, for $(u',i') \in k_u \times k_i$ do.
Step 16.

$$t^U_{t_A,t'} \leftarrow t^U_{t_A,t'} + \alpha \cdot \left( \delta \cdot \left( \sum_{u'}\sum_{t'} c^1_{u',i',t'} \cdot u_{u,u'} \right) - \lambda \cdot t^U_{t_A,t'} \right)$$

Step 17.

$$t^U_{t_B,t'} \leftarrow t^U_{t_B,t'} + \alpha \cdot \left( \delta \cdot \left( -\sum_{u'}\sum_{t'} c^1_{u',i',t'} \cdot u_{u,u'} \right) - \lambda \cdot t^U_{t_B,t'} \right)$$

Step 18.

$$t^I_{t_A,t'} \leftarrow t^I_{t_A,t'} + \alpha \cdot \left( \delta \cdot \left( \sum_{u'}\sum_{t'} c^1_{u',i',t'} \cdot i_{i,i'} \right) - \lambda \cdot t^I_{t_A,t'} \right)$$

Step 19.

$$t^I_{t_B,t'} \leftarrow t^I_{t_B,t'} + \alpha \cdot \left( \delta \cdot \left( -\sum_{u'}\sum_{t'} c^1_{u',i',t'} \cdot i_{i,i'} \right) - \lambda \cdot t^I_{t_B,t'} \right)$$

Step 20. End for.
Step 21. Repeat step 2 to step 20, until the partial derivatives in the foregoing partial derivative calculation formula converge, output $C^1$, $C^2$, U, I, $T^U$, and $T^I$ as the target model parameters.

Step 604. Substitute the target model parameters into the to-be-solved function relationship, to obtain a target function relationship.

In some embodiments, after the target model parameters $C^1$, $C^2$, U, I, $T^U$, and $T^I$ are substituted into the to-be-solved function relationship, that is, Formula 2, the target function relationship is obtained, that is, Formula 4 with $K_u$, $K_i$, and $K_t$ being known parameters.

For step 601 and step 602 to step 604, step 601 may be performed first and then and step 602 to step 604 are performed. Alternatively, step 602 to step 604 may be performed first and then step 601 is performed. This is not limited in the embodiments of this application.

Step 605. Substitute the target account, the target resource and a tag in the tag data into a target function relationship, to obtain a recommendation value corresponding to the tag in the tag data.

In some embodiments, after the target account used as u, the target resource used as i, and the tag in the tag data used as t are substituted into the target function relationship provided in Formula 4, a recommendation value y of the tag t is obtained.

Step 606. Determine n tags with highest recommendation values in the tag data as tags to be recommended to the target account.

In some embodiments, the n tags are used for marking the target resource, n being a positive integer.

In some embodiments, n tags with highest recommendation values are determined, that is, the following Formula 15 is calculated:

$$\text{Top}(u, i, n) = \arg\max_{t \in T}^{n} \hat{y}_{u,i,t} \qquad \text{Formula 15}$$

In conclusion, in the tag recommending method provided in this embodiment, in the process of recommending a tag by using the tag recommending model, the tag recommending model is decomposed into a core tensor and factor matrices after tensor decomposition, and elements in subtensors in the core tensor other than the target subtensors are 0. That is, in an equation relationship, only parts corresponding to the target subtensors in the core tensor are involved in the equation relationship, and remaining parts are not involved in the equation relationship, thereby avoiding a problem of excessively high time complexity caused by a complete three-dimensional core tensor participating in training and application, reducing redundant calculation processes, decreasing time complexity of a process of training and application, and improving tag recommendation efficiency.

In the method provided in this embodiment, the initialized model parameters are adjusted by performing sampling in the historically marked data, and by using the gradient ascent algorithm, thereby avoiding a problem of large time consumption in the adjusting process due to an excessively large volume of the historically marked data when adjustment is performed by using the complete historically marked data.

It is to be understood that, although the steps are displayed sequentially according to the instructions of the arrows in the flowcharts of the embodiments, these steps are not necessarily performed sequentially according to the sequence instructed by the arrows. Unless clearly stated herein, the steps are not performed strictly in the order, and the steps may be performed in other orders. Moreover, at least a part of the steps in the foregoing embodiments may include a plurality of sub-steps or a plurality of stages. The sub-steps or stages are not necessarily performed at the same moment, but may be performed at different moments. The sub-steps or stages are not necessarily performed successively in order, but may be performed in turn or alternately with at least a part of other steps or sub-steps or stages of other steps.

Figure 7:
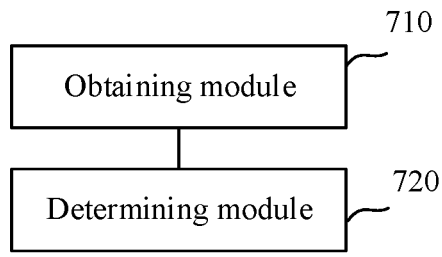
FIG. 7 is a structural block diagram of a tag recommending apparatus according to an exemplary embodiment of this application.

FIG. 7 is a structural block diagram of a tag recommending apparatus according to an exemplary embodiment of this application. The apparatus includes: an obtaining module 710 and a determining module 720. Modules included in the tag recommending apparatus may be implemented all or partially by software, hardware, or a combination thereof.

The obtaining module 710 is configured to obtain a target account and a target resource for which tag recommendation is to be performed.

The determining module 720 is configured to: determine, by using a tag recommending model obtained after tensor decomposition, recommendation values of tags in tag data respectively corresponding to the target account and the target resource, the tag recommending model being decomposed into a core tensor and factor matrices after the tensor decomposition, the tag recommending model being equal to a product of the core tensor and the factor matrices, the core tensor including n subtensors, target subtensors in the n subtensors and the factor matrices being correspondingly multiplied in an equation relationship, and elements in subtensors in the n subtensors other than the target subtensors being 0; and determine n tags with highest recommendation values in the tag data as tags to be recommended to the target account, the n tags being used for marking the target resource, and n being a positive integer.

In some embodiments, the target subtensors include a first subtensor and a second subtensor, the first subtensor and the second subtensor being subtensors located on a main diagonal in cubic-arranged 2*2*2 subtensors obtained after horizontal splitting and vertical splitting are performed on the core tensor.

In some embodiments, the tag data is data in system data, and the system data further includes account data and resource data.

the factor matrices include a first matrix corresponding to the account data, a second matrix corresponding to the resource data, and a third matrix corresponding to the tag data, the first matrix includes an account matrix and a first digital matrix spliced row-wise, the second matrix includes a second digital matrix and a resource matrix spliced row-wise, and the third matrix includes a first tag matrix and a second tag matrix spliced row-wise, where the first digital matrix and the second digital matrix are matrices with elements being 1.

The tag recommending model is equal to a sum of a first product of the first subtensor, the account matrix, the second digital matrix and the first tag matrix, and a second product of the second subtensor, the resource matrix, the first digital matrix and the second tag matrix, where the first subtensor corresponds to the account matrix and the first tag matrix in the equation relationship, and the second subtensor corresponds to the resource matrix and the second tag matrix in the equation relationship.

In some embodiments, the determining module 720 is further configured to determine, according to the equation relationship among the tag recommending model obtained after the tensor decomposition, the core tensor, and the factor matrices, a target function relationship among the account data, the resource data, the tag data, and the recommendation values, the recommendation values being obtained by substituting the target account and the target resource into the target function relationship.

In some embodiments, the system data further includes historically marked data, and the historically marked data includes a historically marked record of an account in the account data for a resource in the resource data.

Figure 8:
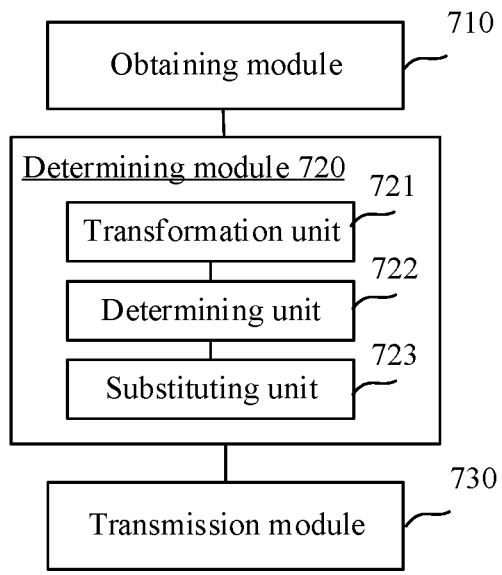
FIG. 8 is a structural block diagram of a tag recommending apparatus according to another exemplary embodiment of this application.

As shown in FIG. 8, the determining module 720 includes:

a transformation unit 721, configured to transform the equation relationship among the tag recommending model obtained after the tensor decomposition, the core tensor, and the factor matrices into a scalar form, to obtain a to-be-solved function relationship among the account data, the resource data, the tag data, and the recommendation values, where the to-be-solved function relationship includes unknown model parameters;

a determining unit 722, configured to solve the unknown model parameters by using the historically marked data, to obtain target model parameters; and a substituting unit 723, configured to substitute the target model parameters into the to-be-solved function relationship, to obtain the target function relationship.

In some embodiments, the unknown model parameters include:

a first parameter used for representing a row-wise width of the account matrix and the first digital matrix, a second parameter used for representing a row-wise width of the second digital matrix and the resource matrix, and a third parameter used for representing a row-wise width of the first tag matrix and the second tag matrix.

In some embodiments, the determining unit 722 is further configured to obtain historically marked data, a preset gradient step, and a preset gradient parameter; initialize the unknown model parameters, to obtain initialized model parameters; sample the historically marked data, to obtain sampled data; adjust the initialized model parameters by using the preset gradient step, the preset gradient parameter, and the sampled data; and when partial derivatives corresponding to the adjusted initialized model parameters do not converge, repeat the step of sampling the historically marked data, until the partial derivatives corresponding to the initialized model parameters converge, to obtain the target model parameters In some embodiments, the obtaining module 710 is further configured to receive the target account and the target resource uploaded by a terminal, the terminal has a video application program installed therein, the target account is an account logged in to the video application program, and the target resource is a video resource played in the video application program by the terminal.

The apparatus further includes: a transmission module 730, configured to transmit the n tags to the terminal as candidate marking tags of the video resource.

In some embodiments, the obtaining module 710 is further configured to receive a tag selected signal transmitted by the terminal, the tag selected signal is a signal transmitted by the terminal after a target marking tag in the candidate marking tags of the video resource is selected.

The determining module 720 is further configured to store, according to the tag selected signal, correspondences among the target account, the video resource and the target marking tag to the system data. The obtaining module 710 and the determining module 720 may be jointly implemented by a processor and a memory.

In this application, the term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

A computer device is further provided in this application, including a processor and a memory, the memory storing computer-readable instructions, the computer-readable instructions, when executed by the processor, causing the processor to perform the steps of the foregoing tag recommending method. The steps of the tag recommending method herein may be the steps in the tag recommending method in the foregoing embodiments. The computer device may be a computer device provided in FIG. 9.

Figure 9:
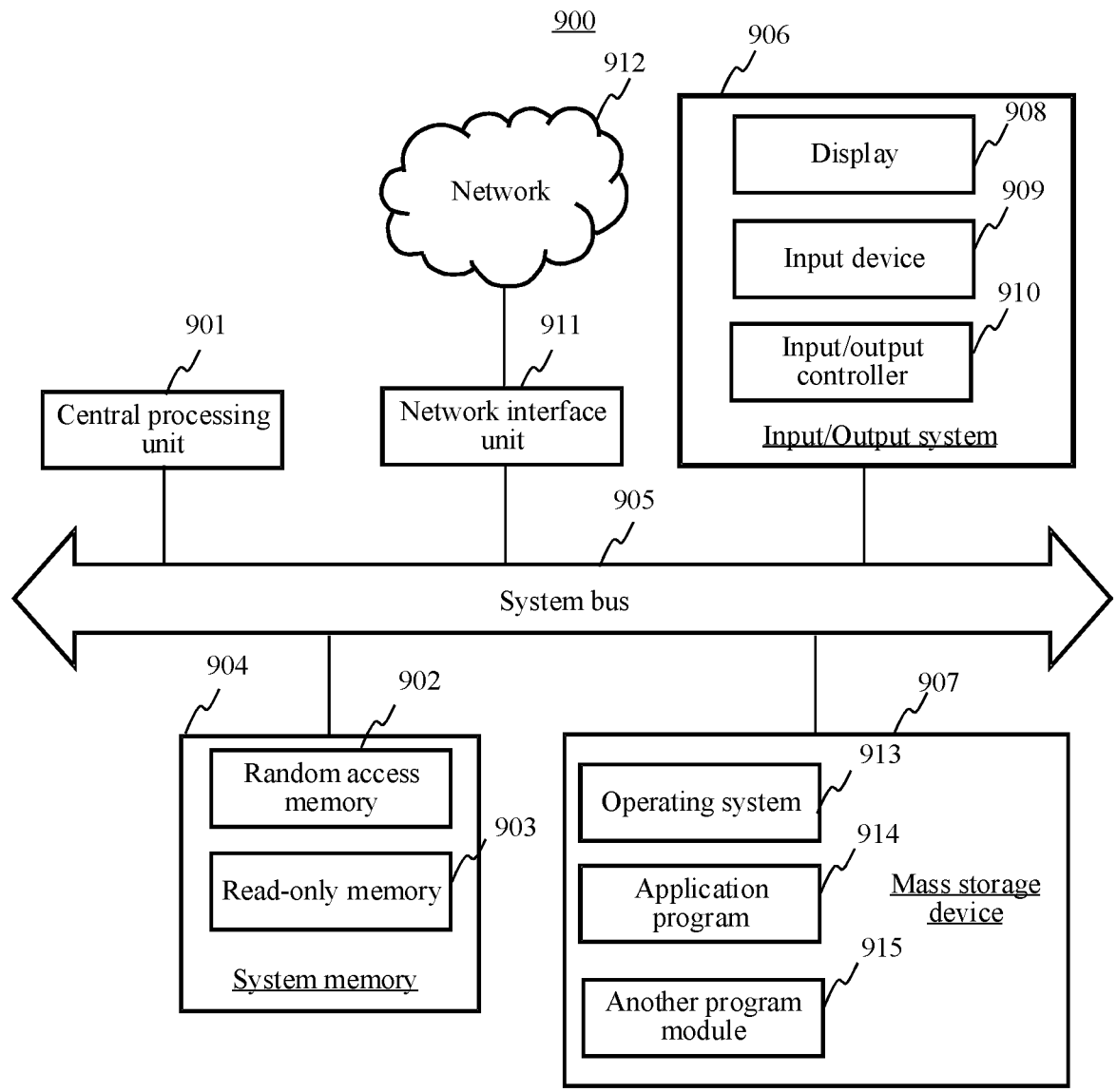
FIG. 9 is a structural block diagram of a computer device according to an exemplary embodiment of this application.

FIG. 9 is a schematic structural diagram of a computer device according to an exemplary embodiment of this application. Specifically, a computer device 900 includes a central processing unit (CPU) 901, a system memory 904 including a random access memory (RAM) 902 and a read-only memory (ROM) 903, and a system bus 905 connecting the system memory 904 and the CPU 901. The computer device 900 further includes a basic input/output (I/O) system 906 assisting in transmitting information between components in the computer, and a mass storage device 907 configured to store an operating system 913, an application program 914, and another program module 915.

The basic I/O system 906 includes a display 908 configured to display information and an input device 909 such as a mouse or a keyboard that is used for inputting information by a user. The display 908 and the input device 909 are both connected to the CPU 901 by using an input/output controller 910 connected to the system bus 905. The basic I/O system 906 may further include the input and output controller 910 to be configured to receive and process inputs from a plurality of other devices such as a keyboard, a mouse, and an electronic stylus. Similarly, the input/output controller 910 further provides an output to a display screen, a printer, or another type of output device.

The mass storage device 907 is connected to the CPU 901 by using a mass storage controller (not shown) connected to the system bus 905. The mass storage device 907 and a computer-readable storage medium associated with the mass storage device provide non-volatile storage to the computer device 900. That is, the mass storage device 907 may include the computer-readable storage medium (not shown) such as a hard disk or a CD-ROI driver.

Without loss of generality, the computer-readable storage medium may include a computer storage medium and a communication medium. The computer storage medium includes volatile and non-volatile, removable and non-removable media that are configured to store information such as computer-readable instructions, data structures, program modules, or other data and that are implemented by using any method or technology. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a magnetic cassette, a magnetic tape, a magnetic disk memory, or another magnetic storage device. Certainly, a person skilled in art can know that the computer storage medium is not limited to the foregoing several types. The system memory 904 and the mass storage device 907 may be collectively referred to as a memory.

The memory stores one or more programs, where the one or more programs are configured to be executed by the one or more CPUs 901, the one or more programs include instructions that are used for implementing the foregoing tag recommending method, and the CPU 901 executes the one or more programs to implement the tag recommending method provided in the foregoing method embodiments.

According to the embodiments of the present disclosure, the computer device 900 may be further connected, through a network such as the Internet, to a remote computer on the network, and run. That is, the computer device 900 may be connected to a network 912 by using a network interface unit 911 connected to the system bus 905, or may be connected to another type of network or a remote computer system (not shown) by using a network interface unit 911.

The memory further includes one or more programs. The one or more programs are stored in the memory and include steps to be executed by the computer device in the tag recommending method provided in the embodiments of the present disclosure.

An embodiment of this application further provides a computer-readable storage medium, storing computer-readable instructions, and the computer-readable instructions, when being executed by a processor, causing the processor to perform the steps in the foregoing tag recommending method. Herein, the steps of the tag recommending method may be the steps of the tag recommending method in the foregoing embodiments.

This application further provides a computer program product, the computer program product, when run on a computer, causing the computer to perform the tag recommending method according to the foregoing method embodiments.

A person of ordinary skill in the art may understand that all or some of the steps of the methods in the embodiments may be implemented by a program instructing relevant hardware. The program may be stored in a computer-readable storage medium. The computer-readable storage medium may be the computer-readable storage medium included in the memory in the foregoing embodiment, or may be a computer-readable storage medium that exists independently and that is not assembled in a terminal. The computer-readable storage medium stores at least one computer-readable instruction, at least one program, a code set or a computer-readable instruction set, the at least one computer-readable instruction, the at least one program, the code set or the computer-readable instruction set being loaded and executed by the processor to implement the tag recommending method according to any one of FIG. 2, FIG. 5 and FIG. 6.

In some embodiments, the computer-readable storage medium may include: a ROM, a RAM, a solid state drive (SSD), an optical disc, or the like. The RAM may include a resistance random access memory (ReRAM) and a dynamic random access memory (DRAM). The sequence numbers of the foregoing embodiments of this application are merely for description purpose but do not indicate the preference of the embodiments.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a ROM, a magnetic disk, an optical disc, or the like.

The technical features in the foregoing embodiments may be randomly combined. To make the description concise, not all possible combinations of the technical features in the foregoing embodiments are described. However, combinations of the technical features shall all be considered as falling within the scope described in this specification provided that the combinations of the technical features do not conflict with each other.

The foregoing embodiments only show several implementations of this application and are described in detail, but they are not to be construed as a limit to the patent scope of this application. A person of ordinary skill in the art may further make variations and improvements without departing from the ideas of this application, which all fall within the protection scope of this application. Therefore, the protection scope of this patent application is subject to the protection scope of the appended claims.

What is claimed is:

1. A tag recommending method, performed by a computer device having one or more processors, memory, and one or more computer programs stored in the memory to be executed by the one or more processors, the method comprising:
   obtaining a target account and a target resource for which tag recommendation is to be performed;
   determining, by using a tag recommending model obtained after tensor decomposition, recommendation values of tags in tag data respectively corresponding to the target account and the target resource, the tag recommending model defining correspondences among account data including the target account, resource data including the target resource and the tag data;
   transforming a relationship among the tag recommending model obtained after the tensor decomposition into a scalar form, to obtain a to-be-solved function among the account data, the resource data, the tag data, and recommendation values, the to-be-solved function comprising unknown model parameters;
   solving the unknown model parameters by using historically marked data, to obtain target model parameters, the historically marked data comprises a historically marked record of an account in the account data for a resource in the resource data; and
   determining n tags with highest recommendation values in the tag data as tags to be recommended to the target account, the n tags being used for marking the target resource, and n being a positive integer, wherein the recommendation values are obtained by substituting the target account and the target resource into a target function.

2. The method according to claim 1, wherein the tag recommending model is decomposed into a core tensor and factor matrices after the tensor decomposition, the tag recommending model being equal to a product of the core tensor and the factor matrices, the core tensor comprising n subtensors, target subtensors in the n subtensors and the factor matrices being correspondingly multiplied in the relationship, and elements in subtensors in the n subtensors other than the target subtensors being 0.

3. The method according to claim 2, wherein the target subtensors comprise a first subtensor and a second subtensor, the first subtensor and the second subtensor being subtensors located on a main diagonal in cubic-arranged 2*2*2 subtensors obtained after horizontal splitting and vertical splitting are performed on the core tensor.

4. The method according to claim 3, wherein
   the factor matrices comprise a first matrix corresponding to the account data, a second matrix corresponding to the resource data, and a third matrix corresponding to the tag data, the first matrix comprises an account matrix and a first digital matrix spliced row-wise, the second matrix comprises a second digital matrix and a resource matrix spliced row-wise, and the third matrix comprises a first tag matrix and a second tag matrix spliced row-wise, wherein the first digital matrix and the second digital matrix are matrices with elements being 1,
   wherein the tag recommending model is equal to a sum of a first product of the first subtensor, the account matrix, the second digital matrix, and the first tag matrix, and a second product of the second subtensor, the resource matrix, the first digital matrix, and the second tag matrix, wherein the first subtensor corresponds to the account matrix and the first tag matrix in the relationship, and the second subtensor corresponds to the resource matrix and the second tag matrix in the relationship.

5. The method according to claim 4, further comprising:
determining, according to the relationship among the tag recommending model obtained after the tensor decomposition, the core tensor, and the factor matrices, the target function among the account data, the resource data, the tag data, and the recommendation values.

6. The method according to claim 5, wherein
determining, according to the equation among the tag recommending model obtained after the tensor decomposition, the core tensor, and the factor matrices, the target function among the account data, the resource data, the tag data, and the recommendation values comprises:
transforming the relationship among the tag recommending model obtained after the tensor decomposition further includes transforming the core tensor, and the factor matrices into a scalar form, to obtain the to-be-solved function relationship among the account data, the resource data, the tag data, and the recommendation values; and
substituting the target model parameters into the to-be-solved function relationship, to obtain the target function relationship.

7. The method according to claim 1, wherein the unknown model parameters comprise:
a first parameter used for representing a row-wise width of the account matrix and the first digital matrix, a second parameter used for representing a row-wise width of the second digital matrix and the resource matrix, and a third parameter used for representing a row-wise width of the first tag matrix and the second tag matrix.

8. The method according to claim 1, wherein solving the unknown model parameters by using the historically marked data, to obtain target model parameters comprises:
obtaining the historically marked data, a preset gradient step and a preset gradient parameter;
initializing the unknown model parameters, to obtain initialized model parameters;
sampling the historically marked data, to obtain sampled data;
adjusting the initialized model parameters by using the preset gradient step, the preset gradient parameter and the sampled data; and
returning, when partial derivatives corresponding to the adjusted initialized model parameters do not converge, to sampling the historically marked data, to obtain sampled data, until the partial derivatives corresponding to the initialized model parameters converge, to obtain the target model parameters.

9. The method according to claim 1, wherein the obtaining a target account and a target resource for which tag recommendation is to be performed comprises:
receiving the target account and the target resource uploaded by a terminal, the terminal having a video application program installed therein, the target account being an account logged in to the video application program, and the target resource being a video resource played in the video application program by the terminal; and
transmitting the n tags to the terminal as candidate marking tags of the video resource.

10. The method according to claim 9, further comprising:
receiving a tag selected signal transmitted by the terminal, the tag selected signal being a signal transmitted by the terminal after a target marking tag in the candidate marking tags of the video resource is selected; and
storing, according to the tag selected signal, correspondences among the target account, the video resource and the target marking tag.

11. A computer device, comprising a memory and a processor, the memory storing computer-readable instructions, the computer-readable instructions, when executed by the processor, causing the processor to perform a plurality of operations including:
obtaining a target account and a target resource for which tag recommendation is to be performed;
determining, by using a tag recommending model obtained after tensor decomposition, recommendation values of tags in tag data respectively corresponding to the target account and the target resource, the tag recommending model defining correspondences among account data including the target account, resource data including the target resource and the tag data; and
transforming a relationship among the tag recommending model obtained after the tensor decomposition into a scalar form, to obtain a to-be-solved function among the account data, the resource data, the tag data, and recommendation values, the to-be-solved function comprising unknown model parameters;
solving the unknown model parameters by using historically marked data, to obtain target model parameters, the historically marked data comprises a historically marked record of an account in the account data for a resource in the resource data; and
determining n tags with highest recommendation values in the tag data as tags to be recommended to the target account, the n tags being used for marking the target resource, and n being a positive integer, wherein the recommendation values are obtained by substituting the target account and the target resource into a target function.

12. The computer device according to claim 11, wherein the tag recommending model is decomposed into a core tensor and factor matrices after the tensor decomposition, the tag recommending model being equal to a product of the core tensor and the factor matrices, the core tensor comprising n subtensors, target subtensors in the n subtensors and the factor matrices being correspondingly multiplied in the relationship, and elements in subtensors in the n subtensors other than the target subtensors being 0.

13. The computer device according to claim 12, wherein the target subtensors comprise a first subtensor and a second subtensor, the first subtensor and the second subtensor being subtensors located on a main diagonal in cubic-arranged 2*2*2 subtensors obtained after horizontal splitting and vertical splitting are performed on the core tensor.

14. The computer device according to claim 13, wherein the factor matrices comprise a first matrix corresponding to the account data, a second matrix corresponding to the resource data, and a third matrix corresponding to the tag data, the first matrix comprises an account matrix and a first digital matrix spliced row-wise, the second matrix comprises a second digital matrix and a resource matrix spliced row-wise, and the third matrix comprises a first tag matrix and a second tag matrix spliced row-wise, wherein the first digital matrix and the second digital matrix are matrices with elements being 1,
wherein the tag recommending model is equal to a sum of a first product of the first subtensor, the account matrix, the second digital matrix, and the first tag matrix, and a second product of the second subtensor, the resource matrix, the first digital matrix, and the second tag matrix, wherein the first subtensor corresponds to the account matrix and the first tag matrix in the relationship, and the second subtensor corresponds to the resource matrix and the second tag matrix in the relationship.

15. The computer device according to claim 14, wherein the computer-readable instructions, when executed by the processor, further causes the processor to perform the following operation:
   determining, according to the relationship among the tag recommending model obtained after the tensor decomposition, the core tensor, and the factor matrices, the target function among the account data, the resource data, the tag data, and the recommendation values.

16. The computer device according to claim 15, wherein determining, according to the equation among the tag recommending model obtained after the tensor decomposition, the core tensor, and the factor matrices, the target function among the account data, the resource data, the tag data, and the recommendation values comprises:
   transforming the relationship among the tag recommending model obtained after the tensor decomposition further includes transforming the core tensor, and the factor matrices into a scalar form, to obtain the to-be-solved function relationship among the account data, the resource data, the tag data, and the recommendation values; and
   substituting the target model parameters into the to-be-solved function relationship, to obtain the target function relationship.

17. The computer device according to claim 11, wherein the unknown model parameters comprise:
   a first parameter used for representing a row-wise width of the account matrix and the first digital matrix, a second parameter used for representing a row-wise width of the second digital matrix and the resource matrix, and a third parameter used for representing a row-wise width of the first tag matrix and the second tag matrix.

18. The computer device according to claim 11, wherein the obtaining a target account and a target resource for which tag recommendation is to be performed comprises:
   receiving the target account and the target resource uploaded by a terminal, the terminal having a video application program installed therein, the target account being an account logged in to the video application program, and the target resource being a video resource played in the video application program by the terminal; and
   the computer-readable instructions, when executed by the processor, further causes the processor to perform the following operation:
   transmitting the n tags to the terminal as candidate marking tags of the video resource.

19. The computer device according to claim 18, wherein the computer-readable instructions, when executed by the processor, further causes the processor to perform the following operation:
   receiving a tag selected signal transmitted by the terminal, the tag selected signal being a signal transmitted by the terminal after a target marking tag in the candidate marking tags of the video resource is selected; and
   storing, according to the tag selected signal, correspondences among the target account, the video resource and the target marking tag.

20. A non-transitory storage medium storing computer-readable instructions, the computer-readable instructions, when executed by one or more processors, causing the one or more processors to perform a plurality of operations including:
   obtaining a target account and a target resource for which tag recommendation is to be performed;
   determining, by using a tag recommending model obtained after tensor decomposition, recommendation values of tags in tag data respectively corresponding to the target account and the target resource, the tag recommending model defining correspondences among account data including the target account, resource data including the target resource and the tag data; and
   transforming a relationship among the tag recommending model obtained after the tensor decomposition into a scalar form, to obtain a to-be-solved function among the account data, the resource data, the tag data, and recommendation values, the to-be-solved function comprising unknown model parameters;
   solving the unknown model parameters by using historically marked data, to obtain target model parameters, the historically marked data comprises a historically marked record of an account in the account data for a resource in the resource data; and
   determining n tags with highest recommendation values in the tag data as tags to be recommended to the target account, the n tags being used for marking the target resource, and n being a positive integer, wherein the recommendation values are obtained by substituting the target account and the target resource into a target function.

* * * * *